United States Patent [19]

Olson

[11] Patent Number: 4,525,946
[45] Date of Patent: Jul. 2, 1985

[54] ROLLER APPARATUS FOR A FLEXIBLE WEB

[76] Inventor: Carl G. Olson, 705 N. Elmhurst Rd., Prospect Heights, Ill. 60070

[21] Appl. No.: 262,529

[22] Filed: May 11, 1981

[51] Int. Cl.³ ............................................. G09F 11/30
[52] U.S. Cl. ...................................... 40/514; 40/584; 40/617; 242/67.4; 160/298
[58] Field of Search ................ 40/513, 617, 514, 155; 242/67.4; 160/298, 239

[56] References Cited

U.S. PATENT DOCUMENTS

| 172,211 | 1/1876 | Vreeland | 160/298 |
|---|---|---|---|
| 187,422 | 2/1877 | Seehausen | 160/298 |
| 316,771 | 4/1885 | Gerdom | 40/514 |
| 1,223,837 | 4/1917 | Sharps | 160/321 |
| 1,284,828 | 11/1918 | Walby | 40/514 |
| 1,485,838 | 3/1924 | Dietz | 40/514 |
| 1,699,555 | 1/1929 | Williams | 160/298 |
| 1,790,662 | 2/1931 | Hanson | 160/298 |
| 2,109,112 | 2/1938 | Hanson | 160/298 |
| 2,501,371 | 3/1950 | Apelt | 160/239 |
| 2,506,209 | 5/1950 | Glass | 40/514 |
| 2,568,245 | 9/1951 | McDonald | 188/83 |
| 3,489,250 | 1/1970 | Kuhlmann | 188/83 |
| 4,009,746 | 3/1977 | Otterbeck | 160/323 R |
| 4,393,915 | 7/1983 | Olson | 160/384 |

FOREIGN PATENT DOCUMENTS

| 1455600 | 12/1963 | Fed. Rep. of Germany | 40/155 |
|---|---|---|---|
| 2115368 | 3/1971 | Fed. Rep. of Germany | 40/155 |

Primary Examiner—Robert Peshock
Assistant Examiner—Wenceslao J. Contreras
Attorney, Agent, or Firm—Trexler, Bushnell & Wolters, Ltd.

[57] ABSTRACT

A roller apparatus is provided for a flexible web such as a map, chart, window shade or the like which is provided on at least one free margin thereof with a rigid, elongated holder element of predetermined cross-sectional dimensions which are substantially greater than the thickness of the flexible webbing material. The roller apparatus comprises a rigid, elongated tubular roll of substantially greater dimensions than the predetermined cross-sectional dimensions of the holder element and including a longitudinal through slot of a cross-sectional dimension smaller than that of the holder element and greater than the thickness of the web. An end cap is non-rotatably attached to either end of the tubular roll. At least one of these end caps includes a through opening of dimensions at least as great as the cross-sectional dimensions of the holder element and peripherally communicating with the through longitudinal slot of the tubular roll for slidably receiving the holder element with the flexible webbing affixed thereto and depending through and below the longitudinal slot. Thus, the holder element and the flexible webbing depending therefrom are slidably insertable into the tubular roll selectively from either right-hand or left-hand margins of the flexible webbing so as to selectively reveal either surface of the flexible webbing with respect to a fixed observer.

5 Claims, 7 Drawing Figures

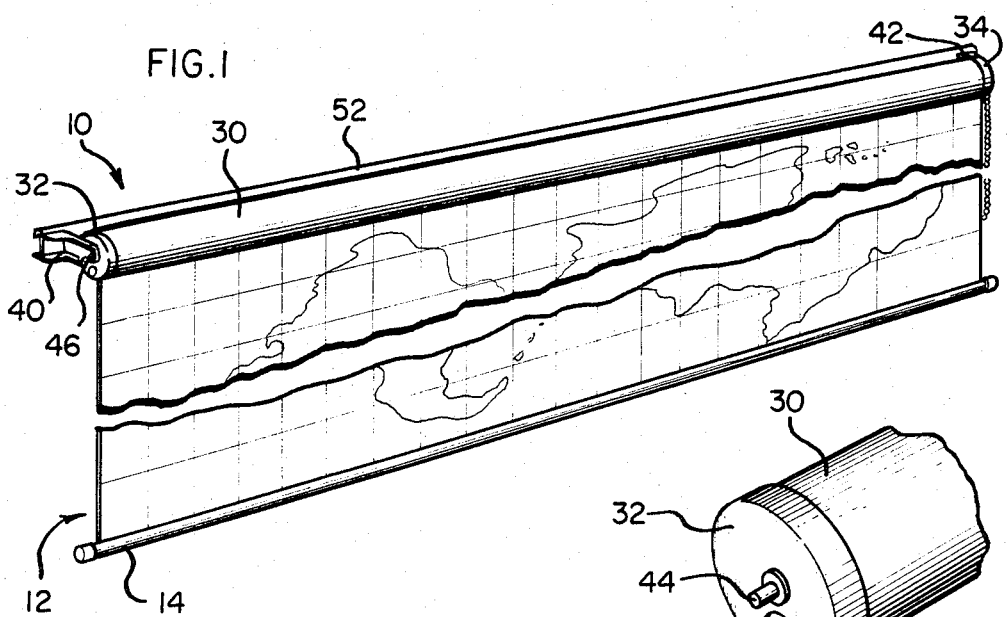
FIG. 1
FIG. 2
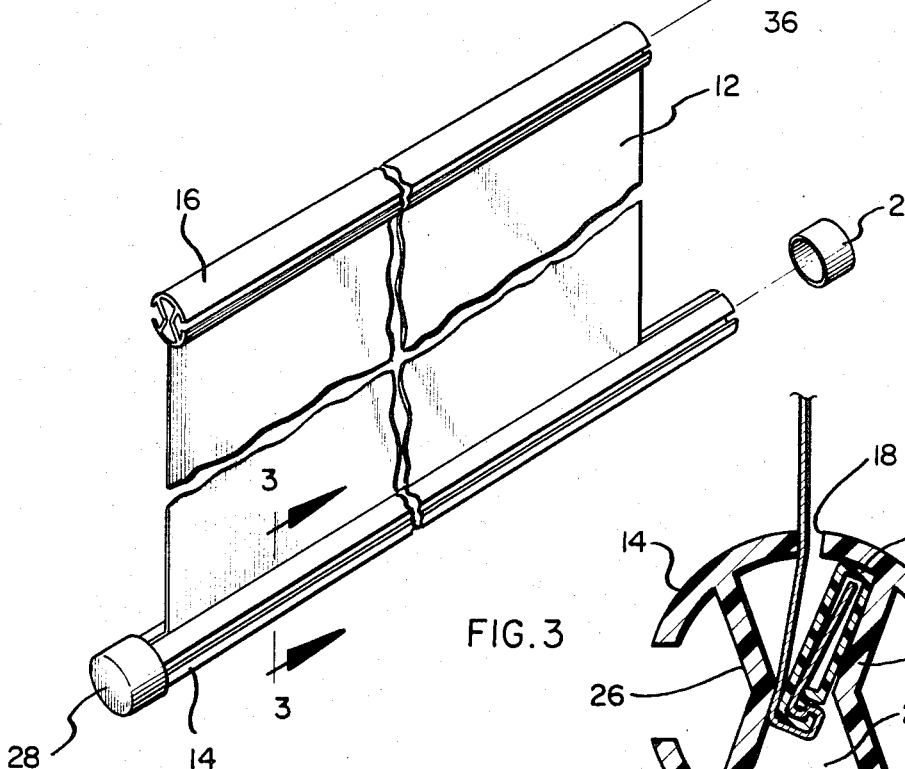
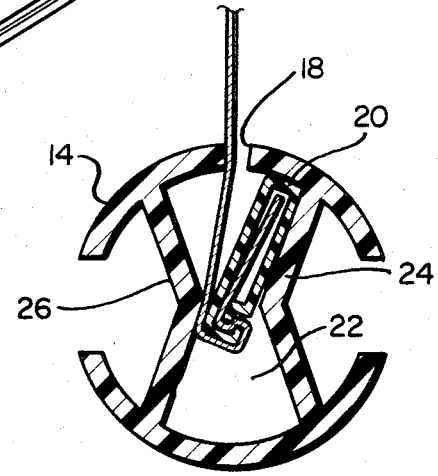
FIG. 3

ROLLER APPARATUS FOR A FLEXIBLE WEB

BACKGROUND OF THE INVENTION

The present invention relates generally to roller apparatus, and more particularly to roller apparatus for rolling a flexible webbing material such as pull-down window shades, maps, charts or the like.

In the past, such window shades, maps, charts and the like have generally been provided with rollers of the spring-loaded type. The flexible webbing is generally firmly attached to the spring-loaded roller, as by tacking or stapling, for example. Moreover, such rollers are constrained to rolling up the attached webbing in a single direction. Accordingly, should the roller malfunction, the shade or chart generally must be carefully removed to effect repair or replacement of the roller. Additionally, such rollers generally do not permit the chart or window shade attached thereto to be readily removed and replaced with a different chart or shade.

Due to the above-mentioned directional constraint of such rollers, the chart or shade carried upon such a roller may not be reversed so as to reveal both sides thereof to a fixed observer. However, such reversibility is both useful and desirable in the case of window shades or the like having different patterns or finishes at either side thereof. For example, window shades are available having a reflective surface at one side thereof and a semi-transparent, generally tinted surface at the other side thereof. Accordingly, it is often desirable during warm summer months to place the reflective surface toward a window to reflect the sunlight back outwardly and thereby aid in cooling the building. On the other hand, during winter months, it is often desirable to reverse such a window shade so as to admit some amount of sun, and further tend to reflect the heat within the building back inwardly. Such a window shade cannot be reversed in this fashion when attached to a conventional spring-loaded roller device.

In the case of charts, maps or the like, which are generally printed or bear information on but one side, conventional rollers permit rolling up thereof in but a single direction, generally with the printed side out. Accordingly, most maps, charts and the like bear a dust cover device attached to the free end thereof which may be rolled and secured around the chart or map when fully rolled on the roller to protect the chart or map from dirt, dust or the like. However, provision of a bidirectional roller device can eliminate the need for such a dust cover, by permitting rolling of the chart or map with the unprinted side outwardly, to serve as protection for the printed side thereof. Further in this regard, rolling in either direction also tends to discourage the chart or map from taking a set or curl in response to being carried for periods of time rolled up on the roller.

OBJECTS AND SUMMARY OF THE INVENTION

It is therefore a general object of the present invention to provide a new and improved roller apparatus for a flexible webbing such as pull-down window shades, maps, charts or the like.

A more specific object is to provide such a roller apparatus which does not require permanent attachment of the window shade, map or the like thereto.

A related object is to provide such a roller apparatus which is rotatable in either direction at all times.

Another object is to provide such a roller apparatus adapted to reversibly receive the chart, map or the like so as to depend therefrom with either surface thereof exposed to a fixed observer.

BRIEF DESCRIPTION OF THE DRAWINGS

The foregoing as well as other objects, features and advantages of the invention will be more readily appreciated upon consideration of the following description together with the accompanying drawings, wherein:

FIG. 1 is a perspective view of a roller apparatus for a flexible web, in accordance with the present invention;

FIG. 2 is an exploded perspective view, partially cut away, showing additional detail of the apparatus of FIG. 1;

FIG. 3 is a sectional view illustrating a web securing device useful with the apparatus of FIGS. 1 and 2;

DETAILED DESCRIPTION OF THE ILLUSTRATED EMBODIMENT

Figure 4:
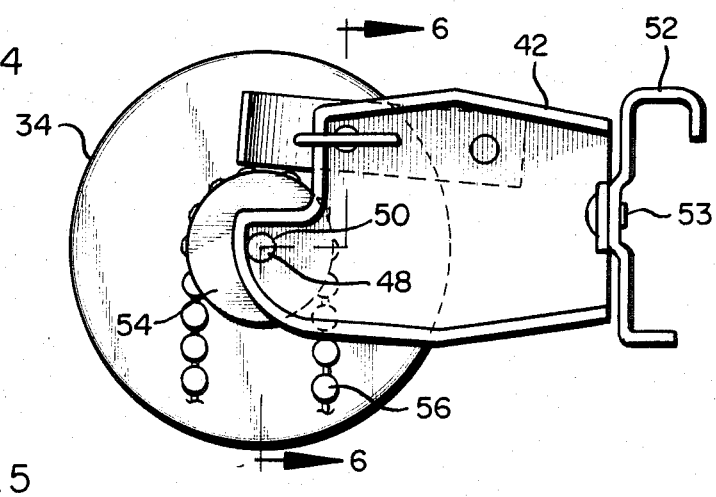
FIG. 4 is an enlarged end view of one end of the roller apparatus of FIG. 1.

Referring now to the drawings and initially to FIG. 1, a roller apparatus in accordance with the invention is designated generally by the reference numeral 10. As illustrated in FIG. 1, this roller apparatus supports a flexible web designated generally by the reference numeral 12. This flexible web 12 may comprise a window shade, map, chart or the like.

Referring also to FIGS. 2 and 3, it will be seen that the flexible webbing 12 is further provided with a pair of web securing devices 14, 16 at top and bottom free margins thereof. These web securing devices 14, 16 are preferably of the configuration and structure shown and described in my copending application Ser. No. 133,346 filed Mar. 24, 1980 for Improved Web Securing Device, which is incorporated herein by reference. Accordingly, these web securing devices need not be described in detail herein.

Suffice it to say that each of the web securing devices 14, 16 comprises an elongate, tubular element having a longitudinal slot 18 through one outer wall thereof, as best seen in FIG. 3. The longitudinal slot serves to receive the webbing 12 therethrough, which is further secured to an elongated rib member 20 which is held within an hour glass-shaped chamber 22 within the web securing element 14. This hour glass-shaped chamber is formed by a pair of complementary inwardly projecting wall surfaces 24, 26. The web securing device 16 at the remaining or top free margin or edge of the web 12 is substantially identical with the web securing device 14 just described with reference to FIG. 2 and FIG. 3. However, the former web securing device 14 is further provided with a pair of end pieces or caps 28.

The roller apparatus 10 includes a tubular, elongate roll element 30 which has affixed thereto a pair of end caps 32, 34. In the illustrated embodiment, this tubular roll 30 is substantially cylindrical and the end caps 32, 34 are substantially circular cup-shaped members. The tubular roll 30 includes a longitudinal through slot 36, best viewed in FIG. 2, which is generally of a greater cross-sectional dimension than the thickness of the web 12 but of lesser cross-sectional dimension than the thickness of the holder element 16, for receiving the holder element 16 interiorly of the tubular roll 30 with the web 12 depending therefrom through the slot 36. Cooperatively, the end cap 32 includes a generally circular through opening 38 which peripherally communicates with the slot 36 for slidably receiving the web securing device 16 therethrough to be received within the tubular roll 30. Advantageously, this structure permits the web securing element 16 with the web 12 affixed thereto to be slidably inserted and/or removed from the tubular roll 30 by way of the opening 38 of the end cap 32, whereby the flexible webbing may depend from the tubular roll 30 with either surface thereof exposed to a fixed observer standing to one side thereof.

Figure 5:
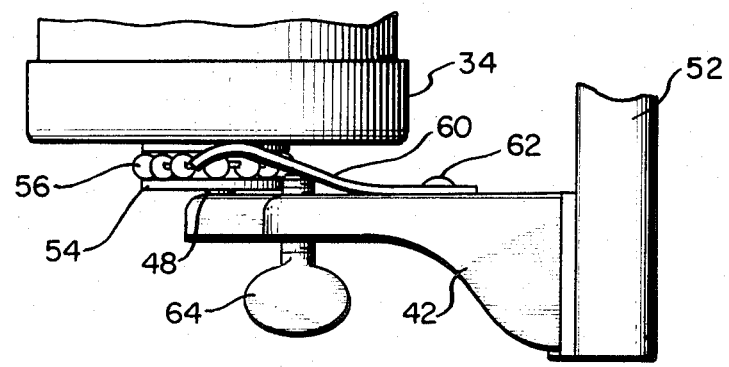
FIG. 5 is a partially cut away top view of the end portion shown in FIG. 4 of the roller apparatus of the invention.
Figure 6:
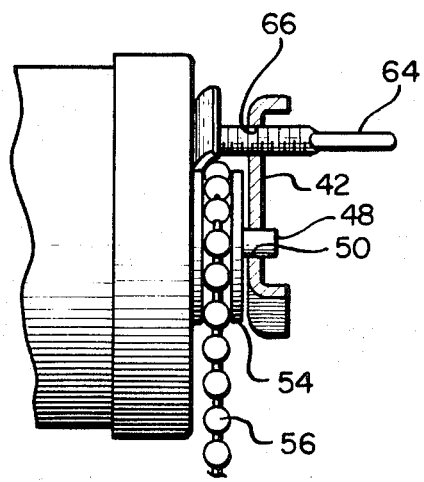
FIG. 6 is a partially cut away front elevation of the end portion of FIG. 4 and taken generally along the line 6—6 of FIG. 4.

In accordance with another feature of the invention, and referring to FIG. 1, a pair of mounting brackets 40, 42 are provided for rotatably mounting the tubular roller 30. More particularly, as best viewed in FIG. 2, it will be seen that the end cap 32 is provided with a substantially centrally located shaft stub 44 which may be rotatably mounted to a corresponding bearing aperture or opening 46 in the bracket 40. Referring also to FIGS. 4, 5, and 6 it will be seen that a like shaft 48 is substantially centrally located with respect to the end cap 34 and permits rotatable mounting thereof with respect to a similar bearing aperture or opening 50 in the mounting bracket 42. Additionally, an elongate mounting strip 52, as best viewed in FIG. 1, may also be provided for receiving the mounting brackets 40, 42 with the tubular roll 30 already rotatably mounted thereto, whereby the apparatus of the invention may be provided as a preassembled unit so as to be readily mountable on a wall surface, or at a window opening, as desired.

These brackets 40 and 42 may be secured to a wall or window surface or the like to permit mounting of the roller apparatus 10 thereto so that the flexible webbing 12 may be depended therefrom with either surface thereof exposed to the observer standing on one side thereof. For example, as discussed above it is often useful to provide a window shade (as the flexible webbing 12) which has a reflective surface on one side thereof. This reflective surface may be mounted to face a window during summer months when it is desired to reflect sunlight and heat energy away from the house or building, and be reversed during the winter months when it is desired to reflect heat energy back inwardly to the house or building.

Reference is again invited to FIGS. 4, 5 and 6 wherein the mounting bracket 42, and cap 34 and associated elements of the invention are illustrated in additional detail. A suitable drive mechanism for selectively rotating the tubular roll 30 in either direction is provided, and in the illustrated embodiment takes the form of a pulley 54 driven by a suitable endless flexible loop member such as a chain 56. In the illustrated embodiment this pulley 54 is circumferentially slotted or otherwise formed to receive the links or ball elements forming the chain 56 to ensure close mechanical contact therebetween. This pulley 54 is non-rotatably mounted substantially centrally with respect to the end cap 34 and mounts at the outer surface thereof the shaft 48 described above. Advantageously, the rotatable mounting of the tubular roll 34 with respect to the end brackets 40 and 42 permits rolling of the tubular roll 30 in either direction (clockwise or counterclockwise as viewed in FIG. 4) to achieve rolling of the depending flexible webbing 12 upon the outer surface of the tubular roll 30. In this regard, it will be recognized that many maps, charts or the like are printed on but one surface thereof whereby rolling in one direction will cause the chart or map 12 to be rolled upon the external surface of the tubular roll 30 with the printed side to the inside, thereby protecting it against dirt, dust or the like when not in use. Accordingly, a separate dust cover as provided in many prior art charts or maps need not be provided with the roller apparatus of the present invention.

Referring still to FIGS. 4, 5 and 6, and in accordance with a further aspect of the invention, an adjustable drag assembly is also provided at the end bracket 42. In the illustrated embodiment this drag assembly includes a substantially flat, elongate member of a hardened, spring-steel material which has been preformed into a relatively shallow, substantially flattened wave form S-shape, as best viewed in FIG. 5. This spring member 60 is affixed at one end thereof to the bracket 42 by means of a suitable fastener such as a rivet 62. The oppositely curved end of the spring member 60 thus extends inwardly of the bracket 42 for engagement with the outer radial end surface of the end cap 34. Cooperatively, a suitable adjustable member such as a thumb screw 64 is threadably advanceable and retractable with respect to a receiving threaded aperture 66 also formed in the bracket 42. In the illustrated embodiment, this thumb screw 64 and its receiving threaded opening 66 are spaced apart from the secured end (at fastener 62) of the spring member 60 so as to bear against the mid portion thereof. This in turn causes the free end of the spring member 60 to bear against the adjacent radial end surface of the end cap 34 with the end surface serving as a friction drag surface for the free end of the spring 60. Advantageously, then, the thumb screw 64 may be selectively advanced or retracted with respect to the bracket 42 for providing the desired amount of bearing force or friction between the spring member 60 and end cap 34. Accordingly, an adjustable amount of drag is provided for opposing the rotation of the tubular roll 30 in response to actuation of the drive means comprising the chain 56 and pulley 54. When the flexible webbing 12 is completely rolled upon the outer surface of the tubular roll 30, this drag assembly comprising the spring 60 and thumb screw 64 may be tightened to substantially prevent unrolling thereof.

Figure 7:
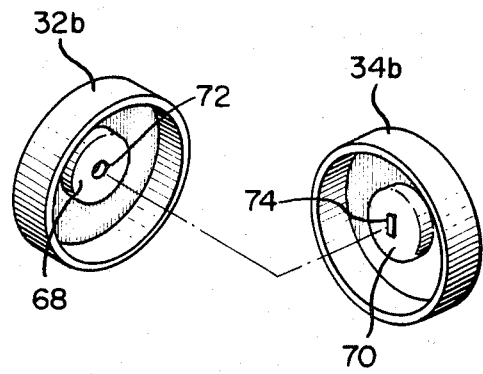
FIG. 7 is a perspective view of a pair of end caps useful in an alternate embodiment of the roller apparatus of the invention.

Referring now to FIG. 7, alternate structures for the end caps 32 and 34 are designated by reference numerals 32b and 34b. It may be desirable in some cases to utilize the tubular roll member 30 merely as a casing or housing for a conventional spring-mounted window shade, chart or the like. In such instances, the end caps 32b and 34b may be readily substituted for the end caps 32 and 34 and assembled with the tubular roll 30. To this end, the end caps 32b and 34b include, interiorly thereof, suitable mounting structures for receiving the respective ends of a conventional spring-loaded roller. Each of these mounting structures includes an inwardly extending cup-shaped member 68, 70 which are respectively provided with a circular slot 72 and a substantially rectangular slot 74 to receive the ends of a conventional spring-loaded roller.

What has been shown and described herein is a novel and improved roller apparatus for a flexible webbing. While the invention has been illustrated and described herein with reference to specific embodiments, the invention is not limited thereto. On the contrary, those skilled in the art may devise various alternatives, changes and modifications upon reading the foregoing descriptions, and the invention is intended to include such changes, alternatives and modifications insofar as they fall within the spirit and scope of the appended claims.

The invention is claimed as follows:

1. A roller apparatus for a flexible web such as a chart, said flexible web being provided on at least one free margin thereof with a rigid, elongated holder element of predetermined cross-sectional dimensions which are substantially greater than the thickness of said flexible webbing material, said roller apparatus comprising: rigid, elongated tubular roll means of substantially greater dimensions than said predetermined cross-sectional dimensions of said holder element and including a longitudinal through slot of a cross-sectional dimension smaller than those of said holder element and greater than the thickness of said web, a pair of end caps with one attached to either end of said tubular roll means for rotation therewith and presenting a radial friction drag surface, one of said end caps including a through opening of dimensions at least as great as the cross-sectional dimensions of said holder element and peripherally communicating with said through longitudinal slot for slidably receiving said holder element with said flexible webbing affixed thereto and depending through and below said longitudinal slot, whereby said holder element and said flexible webbing depending therefrom are slidably insertable into the tubular roll means selectively from either right-hand or left-hand margins of said flexible webbing so as to selectively reveal either surface of said flexible webbing with respect to a fixed observer, each end cap having centered shaft means; a pair of bracket means receiving said shaft means of adjacent end caps for rotatably mounting said roll means with said brackets for rotation in either direction, whereby said flexible webbing may be rolled upon said roll means in either clockwise or counter-clockwise direction; adjustable drag means mounted to an adjacent bracket means for imparting a selectable amount of drag on the friction drag surface of the adjacent one of said end caps during rotation of said roll and bi-directional drive means for selectively rotating said roll means relative to said bracket means to effect rolling of the flexible webbing material in either direction upon said roll means.

2. An apparatus according to claim 1 wherein said adjustable drag means comprises a substantially flat, elongate spring member affixed at one end thereof to said bracket, screw means threadably received on and through said bracket at a position intermediate the ends of said spring member and advanceable and retractable with respect to said bracket and said spring member so as to bear against an intermediate portion of said spring member, thereby urging the free end of said spring member to bear against the radial drag surface of the adjacent end cap.

3. An apparatus according to claim 1 wherein said drive means comprises pulley means affixed to one of said end caps for rotation therewith and a flexible loop member looped around said pulley means for selectively driving said tubular roll means to rotate in either direction.

4. An apparatus according to claim 3 wherein the elongate spring member is disposed between the bracket means and the adjacent end cap with the free end of the spring member bearing against the radial drag surface of the said end cap outwardly of the said pulley means.

5. An apparatus according to claim 1 wherein said holder element and said through slot of said at least one end cap are both substantially circular in cross-section.

* * * * *